July 31, 1923.
A. A. MENDENHALL
1,463,369
RESILIENT WHEEL
Filed June 11, 1919
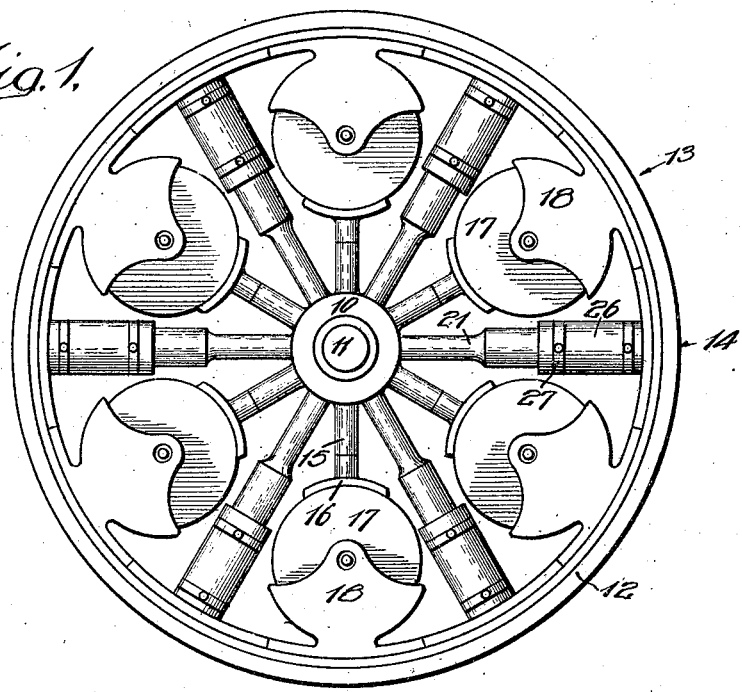
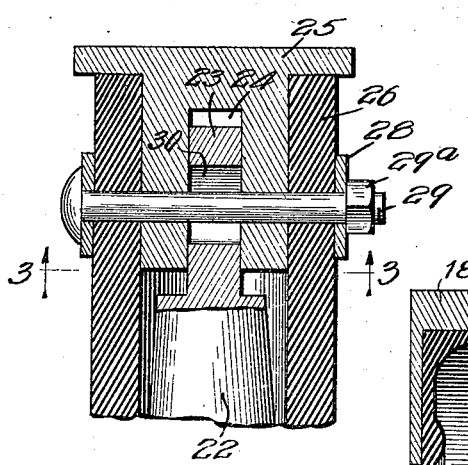
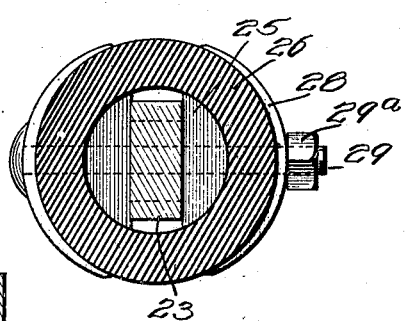
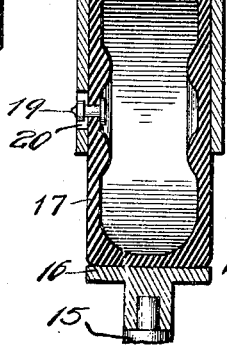
Witnesses:
W. F. Kilroy
Harry R. White
Inventor:
Austin A. Mendenhall
By Miller, Chindahl & Buhu,
Attys.

Patented July 31, 1923.

1,463,369

UNITED STATES PATENT OFFICE.

AUSTIN A. MENDENHALL, OF DULUTH, MINNESOTA.

RESILIENT WHEEL.

Application filed June 11, 1919. Serial No. 303,363.

*To all whom it may concern:*

Be it known that I, AUSTIN A. MENDENHALL, a citizen of the United States, residing at Duluth, in the county of St. Louis and State of Minnesota, have invented certain new and useful Improvements in Resilient Wheels, of which the following is a specification.

My invention relates to vehicle wheels and more specifically to an improved wheel in which devices to absorb the shocks received from the road by the rim of the wheel are placed in the spokes of the wheel between the hub and the rim.

One object of my invention is to provide a pneumatic support for the hub of the wheel comparable in resilience to that obtained with the best pneumatic tires without the use of any pneumatic parts to make contact with the ground. In one embodiment of my invention, I accomplish this object by providing spokes adapted to resiliently cushion radial forces only and a second set of spokes to transmit tangential forces and assist in cushioning the radial forces.

A special object of my invention is to provide a device of the character above referred to wherein all the parts are substantially dust-proof, that is to say, no open crevices or joints between moving parts are exposed to the dust and dirt of the road in such a manner as to allow grit to work in between the parts and impair the operation of the device.

Further objects and advantages of my invention will become apparent as the description proceeds.

In the accompanying drawings, Figure 1 is a side view of a vehicle wheel showing the application of my invention thereto. Fig. 2 is a radial section of one of the torque or sleeve spokes taken in a plane perpendicular to that of the wheel. Fig. 3 is a section of the same spoke on the line 3—3 of Fig. 2. Fig. 4 is a radial section of one of the pneumatic spokes.

In the embodiment of my invention selected for illustration 10 indicates the hub of a vehicle wheel adapted to receive an axle 11. The rim 12 is supported by a plurality of spokes divided into two sets, pneumatic spokes 13 and torque or sleeve spokes 14. Each pneumatic spoke comprises a short section 15, extending outwardly from the hub, carrying at its end a saddle 16 formed of suitable material such as cast metal and adapted to embrace and rest upon about one-fifth of the periphery of a pneumatic cylinder 17. The walls of the cylinder 17 may be of rubber or rubberized fabric, or any combination of the two, in any desired number of plies. The cylinder 17 is carried in a cradle 18 formed of suitable material having two flanges extending on either side of the cylinder and confining the cylinder between them in close gripping engagement when the cylinder is properly inflated through the valve 19. The valve 19 is located at the center of the cylinder 17 and a hole 20 is provided in one of the walls of the cradle allowing sufficient clearance for slight movement of the valve 19 and for removing the valve cap. The cradles 18 may be separate castings suitably attached to the rim 12 of the wheel or the cradles for an entire wheel may be formed of a single casting. As shown, they embrace approximately two-fifths of the periphery of the cylinder 17.

The torque spokes 14 comprise a suitable portion 21 projecting outwardly from the hub and terminating in a tapered portion 22 having at its extreme end a flat tongue 23 extending in the plane of the wheel. The tongue 23 is received in a groove 24 in a suitable socket member or bushing 25 mounted on the rim of the wheel. A sleeve 26 of rubber or rubberized fabric or any desired resilient material embraces the tapered portion 22 of the spoke, being fastened at its inner end to the spoke 21 by any suitable fastening such, for instance, as an ordinary hose clamp at 27 and at its lower end embracing and being firmly fastened to the socket member 25. The fastening means for the outer end of the sleeve 26 comprises two segmental sleeves 28 through which passes a bolt 29 with a nut 29ª clamping them against the sleeve and the sleeve against the bushing. The bolt 29 penetrates both the sleeve and the bushing and passes through a hole 30 in the tongue 23 which hole is considerably larger than the diameter of the bolt, thus allowing the tongue 23 to move in any direction in the groove 24 for a total displacement equal to the difference between the radii of the bolt and the hole.

In the type of wheel illustrated in Figure 1, the pneumatic spokes 13 are to be inflated to carry substantially the entire weight of the vehicle although the sleeves 26 on the torque spokes may conveniently be designed to carry part of the load. The hub is therefore pneumatically supported for all ordinary displacements between the hub and the rim as effectively as if the rim carried a pneumatic tire.

It is within the scope of my invention to build a wheel employing torque spokes only, in which the sleeves 26 are made considerably heavier and are adapted to carry the entire weight of the vehicle.

The sleeves 26 in addition to resiliently supporting the rim from the hub constitute excellent dust-proof protectors for the joints of the torque spokes 14. The cylinders 17 when inflated are tightly gripped by the flanges of the cradles 18 so that there is no opportunity afforded for dust or other foreign material to work into the cradles and affect the cylinders. It will be seen that I have provided a resilient wheel in which the hub is carried almost wholly by pneumatic supporting means which does not make contact with the road. My device is composed of relatively few parts, cheap to manufacture, easy to assemble and repair and durable and dust-proof in actual service conditions.

While I have described and illustrated in detail a preferred embodiment of my invention, it should be clearly understood that such disclosure is illustrative only and that many modifications and improvements will naturally occur to persons skilled in the art. I aim in the subjoined claims to cover all such legitimate modifications and improvements.

I claim as my invention:

1. A spoke for wheels comprising a radially extending member, a socket receiving said member, means allowing a definite limited amount of relative movement between said member and said socket in any direction in the plane of the wheel, and a tubular covering on said socket extending inwardly to cover part of said member.

2. The combination recited in claim 1 in which said tubular covering is fastened at its ends to the member and the socket and is resilient, whereby radial displacements of said socket with respect to said member are cushioned and resisted.

3. A wheel having, in combination, a centrally located hub, a single rim surrounding said hub, and spokes extending between said hub and rim, each spoke comprising a radially extending member, a socket receiving said member, a connection between said socket and member allowing a definite limited amount of relative movement between the parts in any direction in the plane of the wheel, and a tubular covering on said socket extending inwardly to cover said connection and part of said radially extending member.

4. In a vehicle wheel, a spoke comprising a cradle attached to the rim, a pneumatic cylinder in said cradle, said pneumatic cylinder having flat ends and said cradle having flanges partly covering said ends and tightly engaging the same, and a shoe carried by said hub adapted to ride upon said pneumatic cylinder.

5. In a resilient spoke for wheels, a pneumatic cylinder, a cradle embracing approximately two fifths of the periphery of said cylinder, and a shoe opposite said cradle resting on said cylinder throughout approximately one fifth of its periphery.

6. The combination recited in claim 5 in which said cylinder has flat ends and in combination with flanges on said cradle covering a sector of each end amounting to approximately two fifths of the end surface of said cylinder.

7. A resilient wheel comprising, in combination, a rim, a hub, a plurality of radially extensible but substantially non-flexible spokes rigidly secured at their opposite ends to the rim and hub, respectively, whereby to restrain relative rotary motion between the rim and hub, and separate means interposed between the rim and the hub adapted to resist radial forces.

8. A resilient spoke comprising a cradle adapted to be attached to the rim of the wheel and to receive a pneumatic cylinder, having a diameter not less than approximately one-half the radius of the wheel, a pneumatic cylinder in said cradle and a shoe adapted to engage said pneumatic cylinder opposite said cradle.

9. A resilient spoke comprising a cradle attached to the rim of the wheel, a pneumatic cylinder having a diameter not less than approximately half the radius of the wheel and located in said cradle, and a shoe opposite said cradle resting on a materially smaller area than that supported by said cradle.

10. A spoke for wheels comprising a radially projecting member, a tongue on the end of said member, a socket having a groove adapted to receive said tongue, said tongue having an aperture, and a bolt having a diameter materially less than the diameter of said aperture and passing through said socket and said aperture to limit the movement of said tongue in said groove.

11. In a device of the character described, a rim, a hub, a set of radial spokes comprising pneumatic means adapted to resiliently resist radial forces, and another set of spokes fixed against pivotal movement and having a lost motion connection to limit the displacement of said rim with respect to said hub.

12. In a resilient spoke for wheels, a pneumatic cylinder, a cradle embracing a substantial portion of the outer side of said cylinder, and a shoe opposite said cradle resting on a materially smaller area than that supported by said cradle.

13. A resilient wheel comprising a hub, a rim, a plurality of spokes interposed between the hub and rim adapted yieldably to resist relative radial movement therebetween, and separate means acting to resist side thrust and also to restrain relative rotary motion between the rim and hub.

In testimony whereof, I have hereunto set my hand.

AUSTIN A. MENDENHALL.